United States Patent
Chirayil

(10) Patent No.: US 8,929,934 B2
(45) Date of Patent: Jan. 6, 2015

(54) COMMUNICATION DEVICES AND METHODS FOR OPERATING A COMMUNICATION DEVICE

(75) Inventor: Beena Joy Chirayil, Kerala (IN)

(73) Assignee: Intel Mobile Communications GmbH, Neubiberg (DE)

( * ) Notice: Subject to any disclaimer, the term of this patent is extended or adjusted under 35 U.S.C. 154(b) by 332 days.

(21) Appl. No.: 13/455,205

(22) Filed: Apr. 25, 2012

(65) Prior Publication Data

US 2013/0288727 A1    Oct. 31, 2013

(51) Int. Cl.
*H04W 36/20*    (2009.01)

(52) U.S. Cl.
USPC .......................... 455/501; 370/318; 370/333

(58) Field of Classification Search
CPC ............................. H04B 1/1027; H04H 60/33
USPC ......................................................... 455/501
See application file for complete search history.

(56) References Cited

U.S. PATENT DOCUMENTS

| | | | | |
|---|---|---|---|---|
| 5,390,339 A * | 2/1995 | Bruckert et al. | | 455/440 |
| 5,390,345 A * | 2/1995 | Wada et al. | | 455/234.1 |
| 6,014,570 A * | 1/2000 | Wong et al. | | 455/500 |
| 6,091,955 A * | 7/2000 | Aalto et al. | | 455/447 |
| 6,763,074 B1 * | 7/2004 | Yang | | 375/328 |
| 6,804,215 B1 * | 10/2004 | Tanoue | | 370/335 |
| 6,842,476 B2 * | 1/2005 | Lindoff et al. | | 375/144 |
| 6,985,736 B1 * | 1/2006 | Aalto | | 455/447 |
| 7,039,017 B2 * | 5/2006 | Sherlock | | 370/252 |
| 7,184,467 B2 * | 2/2007 | Jacobsen et al. | | 375/222 |
| 7,333,153 B2 * | 2/2008 | Hartson et al. | | 348/608 |
| 7,418,043 B2 * | 8/2008 | Shattil | | 375/260 |
| 7,447,746 B2 * | 11/2008 | Yamaguchi et al. | | 709/208 |
| 7,460,474 B2 * | 12/2008 | Ishii et al. | | 370/230 |
| 7,596,183 B2 * | 9/2009 | Eliaz et al. | | 375/285 |
| 7,606,200 B2 * | 10/2009 | Kwak et al. | | 370/331 |
| 7,822,101 B2 * | 10/2010 | Reial | | 375/144 |
| 7,965,761 B2 * | 6/2011 | Shattil | | 375/147 |
| 7,995,973 B2 * | 8/2011 | Dent et al. | | 455/87 |
| 8,045,638 B2 * | 10/2011 | Grant et al. | | 375/267 |
| 8,064,531 B2 * | 11/2011 | Molnar | | 375/260 |
| 8,068,826 B2 * | 11/2011 | Kuffner et al. | | 455/423 |
| 8,077,673 B2 * | 12/2011 | Son et al. | | 370/331 |
| 8,081,674 B2 * | 12/2011 | Thompson et al. | | 375/224 |
| 8,107,560 B2 * | 1/2012 | Chen et al. | | 375/324 |
| 8,116,253 B2 * | 2/2012 | Anderson | | 370/318 |
| 8,116,402 B1 * | 2/2012 | Lansford | | 375/295 |
| 8,121,236 B1 * | 2/2012 | Furman et al. | | 375/350 |
| 8,135,057 B2 * | 3/2012 | Mondragon-Torres et al. | | 375/232 |

(Continued)

OTHER PUBLICATIONS

Global System for Mobile Communications—3GPP TR 45.903 V10.0.0 3rd Generation Partnership Project; Technical Specification Group GSM/EDGE Radio Access Network; Feasibility Study on Single Antenna Interference Cancellation (SAIC) for GSM networks (Release 10); Mar. 2011; pp. 1-58.

(Continued)

*Primary Examiner* — Hai V Nguyen

(57) ABSTRACT

A communication device is described comprising a receiver configured to receive a radio signal from another communication device via a communication channel; a detector configured to detect the presence of an impairment of the communication channel; a determiner configured to determine a type of the impairment of the communication channel; and a transmitter configured to transmit an indication of the type of the impairment of the communication channel to the other communication device.

17 Claims, 6 Drawing Sheets

(56) References Cited

U.S. PATENT DOCUMENTS

| | | | |
|---|---|---|---|
| 8,151,311 B2* | 4/2012 | Huffman et al. | 725/107 |
| 8,175,539 B2* | 5/2012 | Diener et al. | 455/69 |
| 8,233,427 B2* | 7/2012 | Reial et al. | 370/318 |
| 8,295,330 B2* | 10/2012 | He et al. | 375/148 |
| 8,295,395 B2* | 10/2012 | Mueck et al. | 375/296 |
| 8,345,589 B2* | 1/2013 | Kim et al. | 370/315 |
| 8,351,549 B1* | 1/2013 | Choi et al. | 375/341 |
| 8,351,623 B2* | 1/2013 | Terada | 381/119 |
| 8,374,160 B2* | 2/2013 | Ihm et al. | 370/338 |
| 8,374,613 B2* | 2/2013 | Laroia et al. | 455/440 |
| 8,406,695 B2* | 3/2013 | Hou et al. | 455/63.1 |
| 8,537,926 B2* | 9/2013 | Alapuranen | 375/267 |
| 8,543,154 B2* | 9/2013 | Das et al. | 455/522 |
| 8,582,624 B2* | 11/2013 | Jonsson et al. | 375/148 |
| 8,613,033 B2* | 12/2013 | Huffman et al. | 725/116 |
| 8,666,319 B2* | 3/2014 | Kloper et al. | 455/63.1 |
| 2002/0159547 A1* | 10/2002 | Lindoff et al. | 375/343 |
| 2003/0123420 A1* | 7/2003 | Sherlock | 370/338 |
| 2004/0100588 A1* | 5/2004 | Hartson et al. | 348/608 |
| 2004/0141548 A1* | 7/2004 | Shattil | 375/146 |
| 2004/0203990 A1* | 10/2004 | De Benedittis | 455/522 |
| 2005/0254600 A1* | 11/2005 | Chen et al. | 375/324 |
| 2008/0013480 A1* | 1/2008 | Kapoor et al. | 370/328 |
| 2008/0239937 A1* | 10/2008 | Erickson et al. | 370/201 |
| 2008/0310484 A1* | 12/2008 | Shattil | 375/146 |
| 2008/0317102 A1* | 12/2008 | Reial | 375/148 |
| 2009/0191906 A1* | 7/2009 | Abedi | 455/501 |
| 2009/0197627 A1* | 8/2009 | Kuffner et al. | 455/522 |
| 2009/0316591 A1* | 12/2009 | Reial et al. | 370/252 |
| 2010/0080323 A1* | 4/2010 | Mueck et al. | 375/296 |
| 2010/0157824 A1* | 6/2010 | Thompson et al. | 370/252 |
| 2010/0158093 A1* | 6/2010 | Thompson et al. | 375/227 |
| 2011/0312354 A1* | 12/2011 | Nakamura | 455/500 |
| 2012/0026908 A1* | 2/2012 | Tzannes et al. | 370/252 |
| 2012/0027115 A1* | 2/2012 | Grant et al. | 375/267 |
| 2012/0028645 A1* | 2/2012 | Kim et al. | 455/444 |
| 2012/0082197 A1* | 4/2012 | Jonsson et al. | 375/224 |
| 2012/0207040 A1* | 8/2012 | Comsa et al. | 370/252 |
| 2012/0244903 A1* | 9/2012 | Fong et al. | 455/517 |
| 2012/0263061 A1* | 10/2012 | Reial et al. | 370/252 |
| 2013/0102341 A1* | 4/2013 | Alapuranen et al. | 455/501 |
| 2013/0115986 A1* | 5/2013 | Mueck et al. | 455/501 |
| 2013/0150055 A1* | 6/2013 | Laroia et al. | 455/443 |
| 2013/0163529 A1* | 6/2013 | Chen et al. | 370/329 |
| 2013/0322322 A1* | 12/2013 | Redana et al. | 370/315 |
| 2014/0059634 A1* | 2/2014 | Huffman et al. | 725/116 |

OTHER PUBLICATIONS

Global System for Mobile Communications—3GPP TS 44.018 V.10.2.0 3rd Generation Partnership Project; Technical Specification Group GSM/EDGE Radio Access Network; Mobile radio interface layer 3 specification; Radio Resource Control (RRC) protocol (Release 10), Mar. 2011; pp. 1-431.

Bernard Sklar; Rayleigh fading channels in mobile digital communication systems; Part II. Mitigation; IEEE Communications Magazine; Jul. 1997; pp. 102-109.

* cited by examiner

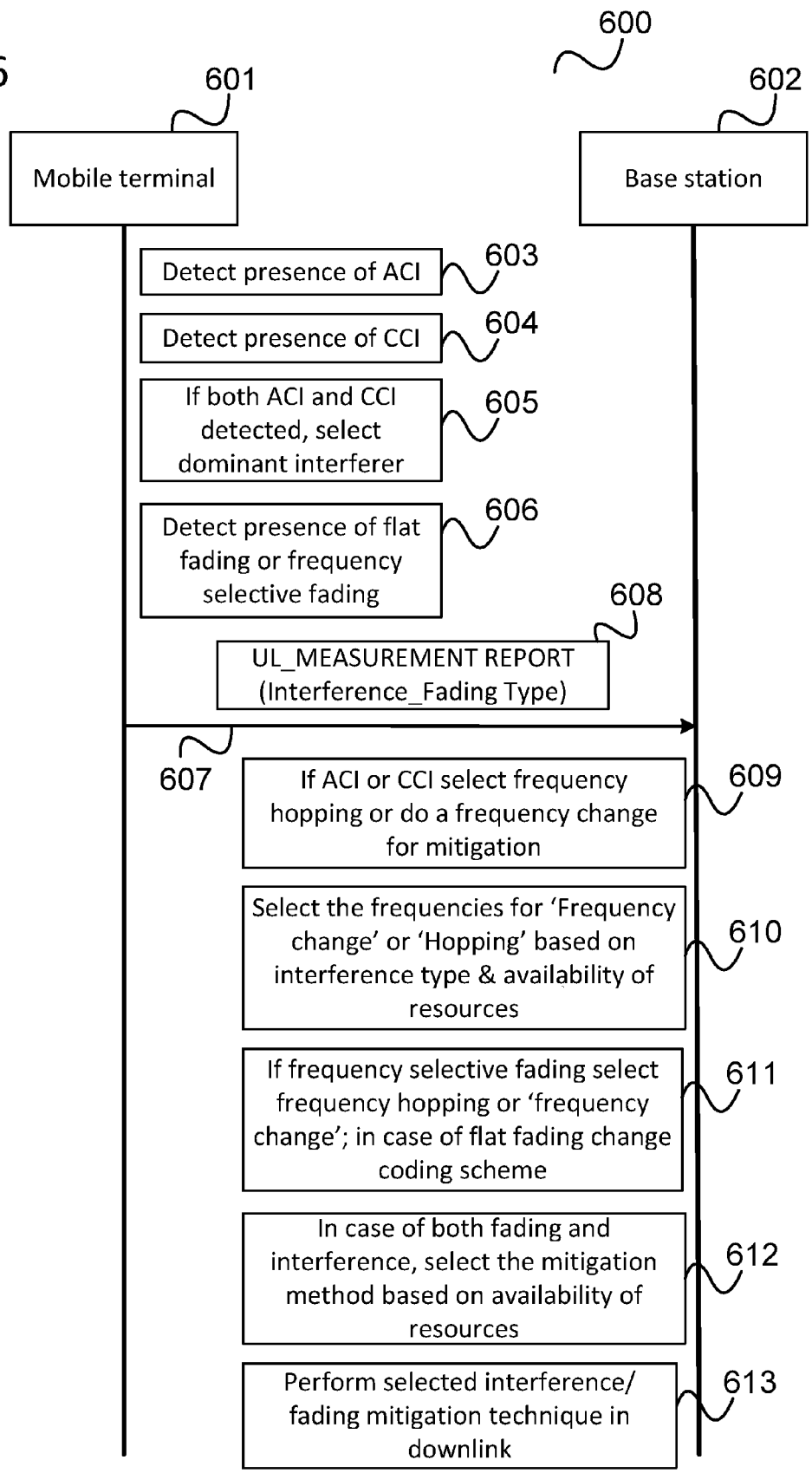

COMMUNICATION DEVICES AND METHODS FOR OPERATING A COMMUNICATION DEVICE

TECHNICAL FIELD

The present disclosure relates to communication devices and methods for operating a communication device.

BACKGROUND

In wireless communication systems, the transmission of radio signals may be negatively affected by various effects such as fading and interference which may lead to a reduction of throughput or loss of signal quality, even loss of signal. Approaches that allow efficient mitigation of such effects are desirable.

SUMMARY

According to one aspect of this disclosure, a communication device is provided including a receiver configured to receive a radio signal from another communication device via a communication channel; a detector configured to detect the presence of an impairment of the communication channel; a determiner configured to determine a type of the impairment of the communication channel; and a transmitter configured to transmit an indication of the type of the impairment of the communication channel to the other communication device.

According to another aspect of this disclosure, a communication device is provided including a transmitter configured to transmit a radio signal to another communication device via a communication channel; a receiver configured to receive an indication of a type of an impairment of the communication channel from the other communication device; and a controller configured to determine, based on the indication, a mitigation mechanism for mitigating the impairment and to control the transmitter according to the determined mitigation mechanism.

According to other aspects of this disclosure, methods for operating a communication device as described above, or in other words, methods for operating a communication system using the communication devices described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 6 shows a flow diagram.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
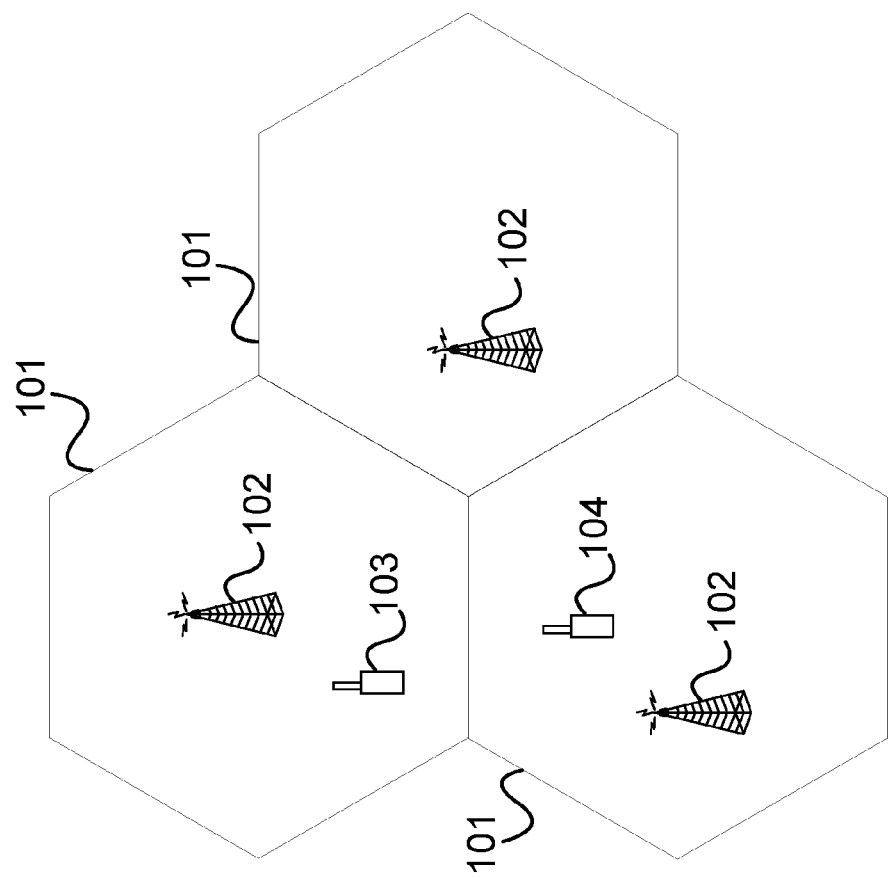
FIG. 1 shows a communication arrangement.

FIG. 1 shows a communication arrangement 100.

The communication arrangement 100 includes radio cells 101 wherein each radio cell 101 is operated by a respective base station 102. The base stations 102 are for example part of a radio access network of a mobile communication network. A mobile terminal 103 located in one of the radio cells 101 may communicate with the base station 102 operating the radio cell 101 (over the so-called air interface) and may thus be provided with a communication connection to another mobile terminal 104 located in the same radio cell 101 or a different radio cell 101 (or even a radio cell of another mobile communication network), a core network of the mobile communication network or other communication networks such as the Internet or other mobile communication networks.

The mobile communication network may be a cellular mobile communication network according to various standards. For example, the mobile communication network is a 2G, 3G or a 4G wireless communication system, e.g. according to one of the following standards:

GSM: Global System for Mobile Communications, or GSM is a standard for mobile telephone systems. GSM utilizes a combination of frequency division multiple access (FDMA) and time division multiple access (TDMA) on the air interface. A GSM network includes several elements: the mobile station (MS), the subscriber identity module (SIM), the base transceiver station (BTS), the base station controller (BSC), the transcoding and rate adaptation unit (TRAU), the mobile services switching centre (MSC), the home location register (HLR), the visitor location register (VLR), and the equipment identity register (EIR). Together they form a public land mobile network (PLMN).

GPRS: GPRS (General Packet Radio Service) represents an evolution of the GSM standard, allowing data transmission in packet mode and providing higher throughputs as compared with the circuit-switched mode. This evolution is usually presented under the designation of 2.5G to point out that it is a transition technology between 2G and 3G. The GPRS network architecture reuses the GSM network nodes such as MSC/VLR, HLR, and BSS. New network nodes have been introduced for the transport of packet data. These nodes are the gateway GPRS support nodes (GGSN) and serving GPRS support nodes (SGSN). The subnetwork formed by the SGSNs and the GGSNs is called the GPRS core network.

UMTS (WCDMA & TD-SCDMA): Universal Mobile Telecommunications System (UMTS) is a third generation mobile cellular technology. UMTS employs wideband code division multiple access (W-CDMA) radio access technology to offer greater spectral efficiency and bandwidth to mobile network operators. UMTS provides several different terrestrial air interfaces, called UMTS Terrestrial Radio Access (UTRA). TD-SCDMA or Time Division Synchronous Code Division Multiple Access (also known as UTRA-TDD) uses Time Division Duplexing (TDD) at the air interface while WCDMA (also known as UTRA-FDD) uses the Frequency Division Duplexing (FDD) at the air interface.

CDMA2000: CDMA2000 is a family of 3G mobile technology standards, which use CDMA channel access, to send voice, data, and signaling data between mobile phones and cell sites.

LTE: LTE is a set of enhancements to the Universal Mobile Telecommunications System (UMTS) which was introduced in 3rd Generation Partnership Project (3GPP) Release 8. LTE supports peak download rates up to 299.6 Mbit/s and upload rates up to 75.4 Mbit/s depending on the user equipment (UE) category. It provides support for both FDD and TDD communication systems as well as half-duplex FDD with the same radio access technology The mobile communication network may also be a local area network or a metropolitan area network, e.g. according to a WLAN (Wireless Local Area Network) standard. The base stations 102 may in this case for example be access points. It should be noted that aspects of this disclosure may also be based on other communication networks (not necessarily being cellular) such as Bluetooth piconets etc.

A communication device acting as receiver, e.g. the mobile terminal 103 in case of downlink transmission (i.e. transmission from the base station 102 to the mobile terminal 103) may detect the nature and statistical properties of an interferer causing interference to the transmission by using a variety of techniques. For example, the spectrum of the received signal may be analyzed. Complex techniques that use feature extraction and/or statistical analysis to detect the nature and properties of interferences may also be used. In the following, basic methods to detect the presence of Adjacent Channel Interference (ACI) & Co-Channel Interference (CCI) are described that may be used. These methods are of exemplary nature and in practice a wide variety of mechanisms may be employed to detect the nature and statistical properties of the dominant interferer.

Adjacent channel interference refers to the leakage of a signal from a neighboring communication channel (in terms of the allocated frequency resources) into the communication channel used by the receiver, for example the leakage of the GSM signal from a neighboring 270 KHz channel into the channel used by the receiver in case of a GSM communication system. Adjacent channel interference may be detected by comparing the inband signal power and the guard-band signal power. If P_ib is the inband power (energy of the signal lying inside the useful 200 KHz band of the signal), and if P_gb is the guard band power (energy of the signal lying outside the useful (200 KHz) band of the signal), then the presence of ACI can be ascertained if P_ib/P_gb>threshold. Hence the presence of adjacent channel interference may be detected by analyzing the signal and guard-band power.

Co-channel interference refers to an inadvertent leakage of a neighboring communication into the channel used by the receiver, i.e. a communication in the vicinity, for example using (at least partially) the same frequency recourses as allocated to the channel used by the receiver, e.g. by the other mobile terminal 104, for example of a neighboring GSM communication into the receiver's 270 KHz channel in case of a GSM communication system. Various blind and non-blind co-channel interference detection and mitigation techniques can be used. The presence of co-channel interference may for example be detected by analyzing the spectrum of the signal or the estimation noise as in MUD (Multi-user Detection) and SAIC (Single Antenna Interference Cancellation).

The SAIC algorithm proposed by 3GPP uses the estimation noise statistics to develop interference mitigation filters. Multi-user detection and SAIC algorithms detect the nature and statistical properties of the interferer as a part of their interference mitigation technique.

Another method to detect the presence of Co-channel Interference is by analyzing the spectrum of the received signal. The received signal consists of the useful signal and the interference signal. Let P_s be the power of the useful signal determined, and P be the power of the received signal. Co-channel interference can be seen to be detected when (P−P_s)/P exceeds a certain threshold.

Transmission signals, for example received by the mobile terminal 103 in downlink communication, may also be affected by fading effects.

In the following, basic methods to detect the presence of flat fading and frequency selective fading that may be used, e.g. by the mobile terminal 103, are described.

During the process of equalization and demodulation, e.g. of a GSM transmission signal, a model for the channel, known as the channel impulse response (CIR) is typically computed. The channel impulse response is typically given by the channel coefficients. The type of fading may be approximated by looking at the channel coefficients.

Delay spread is a measure of the dispersion in the channel. The greater the delay spread, the lower the coherence bandwidth. Fading may be classified as flat fading or frequency selective fading based on the coherence bandwidth and therefore based on the delay spread. The delay spread may be empirically measured by looking at the channel PDP (Power Delay Profile). A simple way to do this is to find the abs-square of each of the channel coefficients. If $[h_1, h_2, h_3, \ldots, h_n]$ are the channel coefficients, then the PDP can be given by $[|h_1|^2, |h_2|^2, \ldots, |h_n|^2]$. If these PDP values are normalized and the range over which the PDP values exceed a threshold is found the delay spread of the channel can be approximated. Now, if delay spread>threshold, then frequency selective fading can be ascertained; else the presence of flat fading can be ascertained.

The mobile terminal 103 may according to 3GPP perform uplink measurement reporting. According to 3GPP, a measurement report is sent from the mobile terminal 103 (e.g. configured as a UE according to UMTS or LTE) in uplink which contains parameters Rxlev (representing received signal power level) and Rxqual (representing received signal quality), which can be used by the base station 102 to estimate the downlink channel quality.

The measurement report message for example has, according to 3GPP, the content as given in table 1.

TABLE 1

| Information element | Type/Reference | Presence | Format | length |
|---|---|---|---|---|
| RR management Protocol Discriminator | Protocol Discriminator | M | V | ½ |
| Skip Indicator | Skip Indicator | M | V | ½ |
| Measurement Report Message Type | Message Type | M | V | 1 |
| Measurement Results | Measurement Results | M | V | 16 |

The Measurement Results information element (16 octets) is to provide the results of the measurements made by the mobile terminal 103 on its serving radio cell 101 and also one or more neighboring radio cells 101.

The decision for initiating downlink frequency hopping on the base station side may be based on the values of Rx channel quality and Rxlev reported by the mobile terminal 103 in uplink via the measurement report message. From the Rxlev & Rxqual values reported by the mobile terminal 103, it is possible to confirm the presence of interference but from this, it is not possible for the base station to separately distinguish the presence of Adjacent Channel Interference (ACI) or Co-Channel Interference (CCI) or Flat Fading or Frequency Selective Fading. Thus, based on the measurement report message as illustrated in table 1, the base station 102 may not be able to select the best suitable mitigation technique.

For example, if presence of fading is confirmed at the base station side, as mentioned above, the base station may initiate downlink frequency hopping. However, the base station 103 may end-up triggering frequency hopping even for flat fading for which frequency hopping cannot help in fading mitigation since flat fading is not dependent on the frequency used. Also, one or more of the frequencies in the downlink hopping frequencies selected by the base station 103 might get affected more by co-channel or adjacent-channel interferers when the base station is unaware of them when selecting the hopping frequencies.

Although the base station 102 may assign the uplink & downlink communication resources to the mobile terminal 103, the base station 102 may not be able to completely detect the presence of adjacent channel interference (ACI) since an interfering adjacent channel could be of another network operator or could belong to the spectrum of other communication systems. Further, at the base station side, the presence of co-channel interferer in downlink cannot be estimated.

According to one aspect of this disclosure, the knowledge of the nature and statistical properties of interference and/or fading estimated at the receiver (e.g. the mobile terminal 103 in case of downlink transmission and the base station 102 in case of uplink transmission) can be seen to be used in a closed-loop fashion along with the transmitter (e.g. the mobile terminal 103 in case of uplink transmission and the base station 102 in case of downlink transmission) to improve the overall efficiency of the system.

Figure 2:
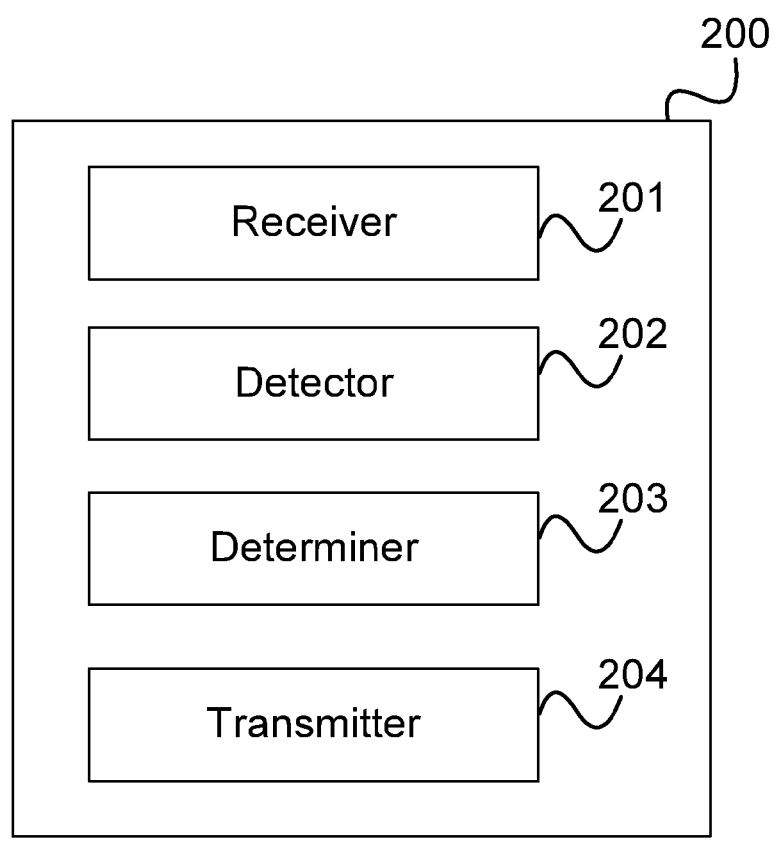
FIG. 2 shows a communication device.

Generally, according to an aspect of this disclosure, a communication device is provided as illustrated in FIG. 2.

FIG. 2 shows a communication device 200.

The communication device 200 includes a receiver 201 configured to receive a radio signal from another communication device via a communication channel and a detector 202 configured to detect the presence of an impairment of the communication channel.

The communication device further includes a determiner 203 configured to determine a type of the impairment of the communication channel and a transmitter 204 configured to transmit an indication of the type of the impairment of the communication channel to the other communication device.

In other words, according to one aspect of this disclosure, a communication device indicates to another communication device the type of effect which has a negative impact on the transmission of signals from the other communication device to this communication device. In other words, the type of the negative effect is fed back to the other communication device such that the other communication device may perform the subsequent transmission of signals (e.g. data, voice, multimedia) to the communication device according to the type of the negative effect (e.g. type of disturbance).

The type of impairment in a communication channel can be for example a fading type. For example, the type of the impairment of the communication channel is flat fading or frequency selective fading.

The type of the impairment of the communication channel may also be an interference type.

The type of the impairment of the communication channel may be both a fading type and an interference type.

The type of the impairment of the communication channel is for example an interference type of a dominant interferer, e.g. in case of more than one interference types.

For example, the type of the impairment of the communication channel is adjacent channel interference or co-channel interference.

According to one aspect of this disclosure, the communication device is a mobile communication terminal and the other communication device is a base station or the communication device is a base station and the other communication device is a mobile communication terminal.

The indication is for example transmitted with a measurement report message.

The measurement report message may further include at least one of an indication of the power level of the received signal and an indication of the quality of the received signal.

Figure 3:
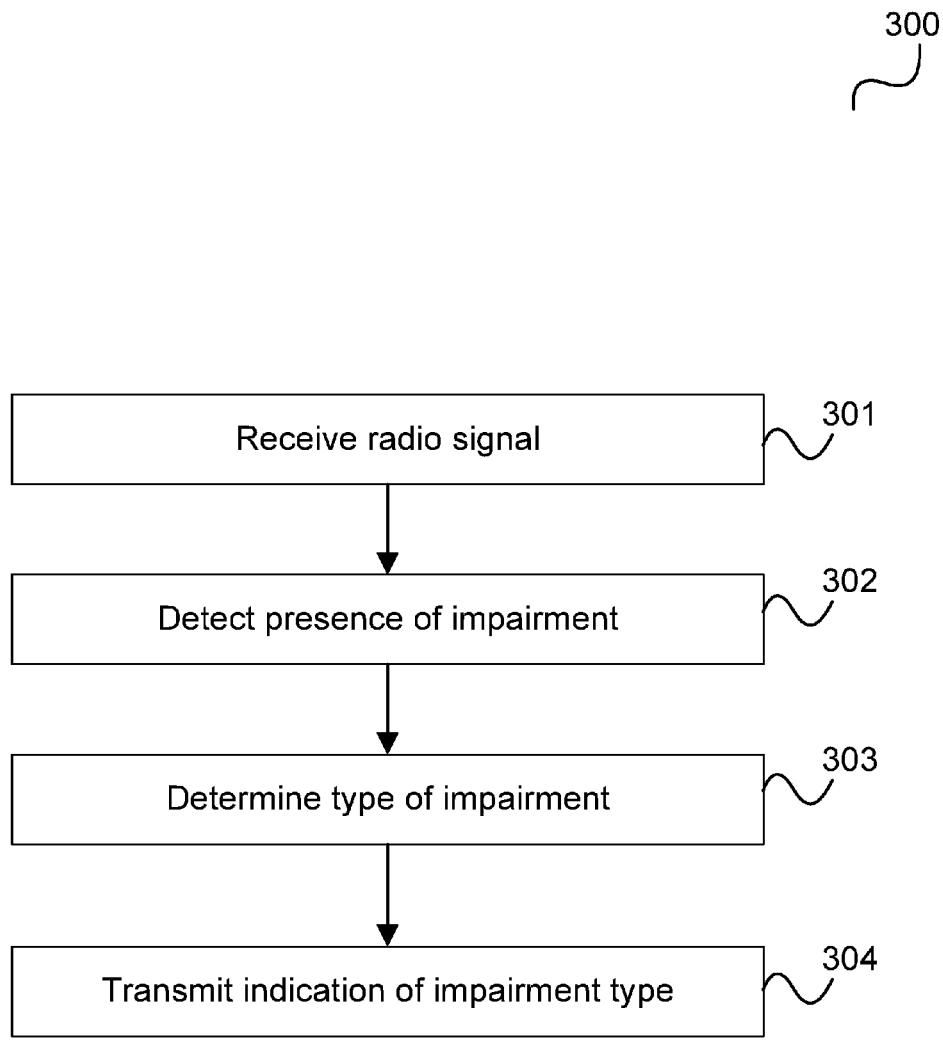
FIG. 3 shows a flow diagram.

For example, the communication device 200 carries out a method as illustrated in FIG. 3.

FIG. 3 shows a flow diagram 300.

The flow diagram 300 illustrates a method for operating a communication device.

In 301, the communication device receives a radio signal from another communication device via a communication channel.

In 302, the communication device detects the presence of an impairment of the communication channel.

In 303, the communication device determines a type of the impairment of the communication channel.

In 304, the communication device transmits an indication of the type of the impairment of the communication channel to the other communication device.

Figure 4:
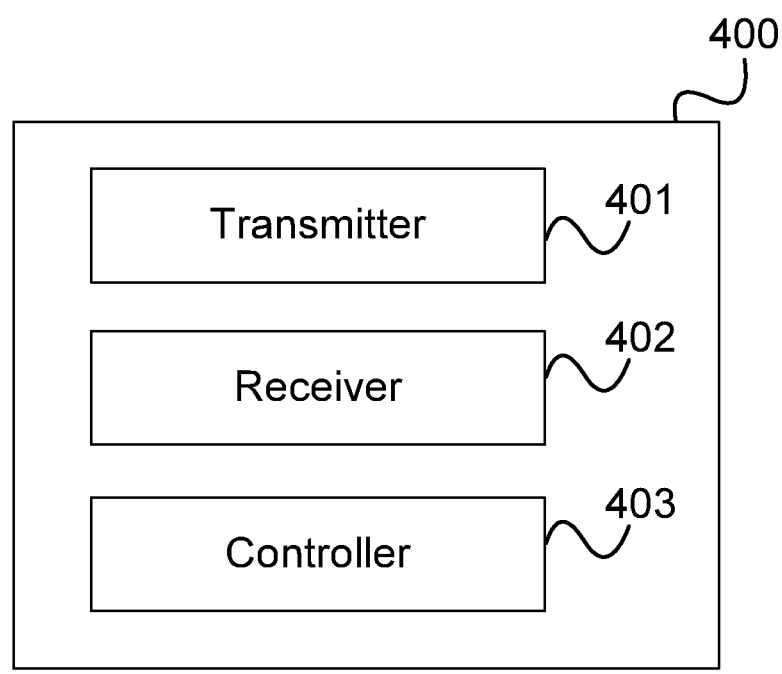
FIG. 4 shows a communication device.

The communication device 200 may for example communicate with a communication device as illustrated in FIG. 4.

FIG. 4 shows a communication device 400.

The communication device 400 may for example correspond to the other communication device referred to in the description of FIG. 2.

The communication device 400 includes a transmitter 401 configured to transmit a radio signal to another communication device via a communication channel and a receiver 402 configured to receive an indication of a type of an impairment of the communication channel from the other communication device.

The communication device 400 further includes a controller 403 configured to determine, based on the indication, a mitigation mechanism for mitigating the impairment and to control the transmitter according to the determined mitigation mechanism.

The other communication device in this context may for example correspond to the communication device 200.

The mitigation mechanism is for example frequency hopping.

The mitigation mechanism is for example a change in the frequency or frequencies assigned to the communication device, e.g. assigned to the communication channel.

The communication device and the other communication device may for example be communication devices of a cellular mobile communication system and the mitigation mechanism may be a handover (between radio cells). The mitigation mechanism may also be a new channel assignment or a physical channel reconfiguration.

The mitigation mechanism may for example be a change of the coding scheme used by the transmitter to transmit radio signals to the other communication device.

According to one aspect of this disclosure, the controller can determine a mitigation mechanism other than frequency hopping or change in frequency assigned if the indication indicates that the type of impairment is flat fading.

The controller may for example be configured to determine the mitigation mechanism further based on the communication resources available for the communication between the communication device and the other communication device.

Figure 5:
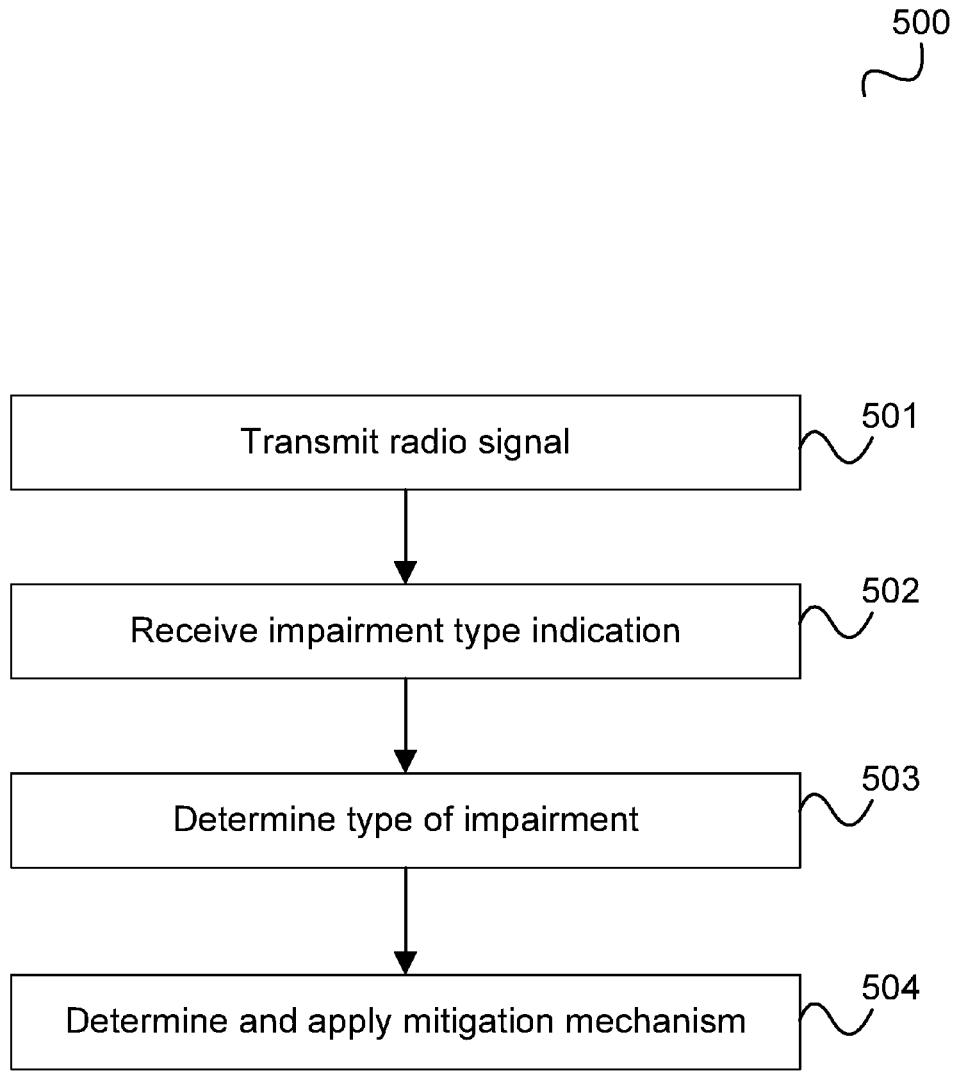
FIG. 5 shows a flow diagram.

The communication device 400 for example carries out a method as illustrated in FIG. 5.

FIG. 5 shows a flow diagram 500.

The flow diagram 500 illustrates a method for operating a communication device.

In 501, the communication device transmits a radio signal to another communication device via a communication channel.

In 502, the communication device receives an indication of a type of an impairment of the communication channel from the other communication device.

In 503, the communication device determines, based on the indication, a mitigation mechanism for mitigating the impairment.

In 504, the transmitter is controlled (e.g. by a controller of the communication device) according to the determined mitigation mechanism.

It should be noted that aspects described in context with one of the communication devices 200, 400 are analogously valid for the other communication device 200, 400 and the methods for operating a communication device and vice versa.

The various components of each of the communication devices 200, 400 (such as the detector, the determiner, the controller etc.) may be implemented by a circuit of the communication device 200, 400. A "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In the following, an example is described in more detail with reference to FIG. 1 and FIG. 6, i.e. where the communication device 200 corresponds to the mobile terminal 103 and the communication device 400 corresponds to the base station 102 operating the radio cell 101 which is used by the mobile terminal 103 (in other words the serving radio cell of the mobile terminal 103).

FIG. 6 shows a flow diagram 600.

A mobile terminal 601 corresponding to the mobile terminal 103 and a base station 602 corresponding to the base station 102 are involved in the flow.

In 603, the mobile terminal 601 detects whether adjacent channel interference (ACI) in downlink direction (i.e. in the transmission from the base station 602 to the mobile terminal 601) is present.

In 604, the mobile terminal 601 detects whether there is co-channel interference (CCI) in downlink direction.

In 605, if both ACI and CCI are present the mobile terminal 103 determines the dominant interferer.

The presence of adjacent channel interference and co-channel interference in downlink direction can be detected by the mobile terminal 601 using the methods described above. It should be noted that the detection methods mentioned are of exemplary nature and in practice a wide variety of mechanisms may be employed to detect the nature and statistical properties of the dominant interferer.

In 606, the mobile terminal 601 detects whether flat fading and/or frequency selective fading are present in downlink direction for the channel assigned for the downlink data transmission.

The presence of flat fading or frequency selective fading in downlink direction can be detected by the mobile terminal 601 using the methods mentioned described above. It should be noted that the methods mentioned are exemplary in nature and a wide variety of mechanisms can be used to determine the fading type.

In 607, the mobile terminal 601 reports the interference type and/or the fading type along with the received signal power level and the received signal quality measurements in an uplink measurement report message 608 to the base station 602. In presence of both ACI and CCI the mobile terminal 601 reports only the dominant interferer in this example.

The uplink measurement report message 608 may have the content and structure as illustrated in table 1 (in accordance with 3GPP).

The Measurement Results information element (last row of table 1) may have the following structure (in accordance with 3GPP).

TABLE 2

| 8 | 7 | 6 | 5 | 4 | 3 | 2 | 1 | |
|---|---|---|---|---|---|---|---|---|
| | | | Measurement Results IEI | | | | | octet 1 |
| | | | Measurement Results Contents | | | | | octets 2-17 |

Table 3 illustrates the structure of the element 'Measurement Results Contents' in CSN.1 notation as it is used according to one aspect of this disclosure.

TABLE 3

```
< Measurement Results Contents > ::=
  { < BA_USED : bit (1) >
    < DTX_USED : bit (1) >
    < RXLEV_FULL_SERVING_CELL : bit (6) >
    < 3G_BA_USED : bit (1) >
    < MEAS_VALID : bit (1) >
    < RXLEV_SUB_SERVING_CELL : bit (6) >
    < IS_INTERFERENCE_FADING_TYPE_PRESENT : bit (1) >
    {  0    < spare bits : bit(8) >
        | 1 < INTERFERENCE_FADING_TYPE : bit (3) >
           < spare bits : bit (5) >
    }
    < RXQUAL_FULL_SERVING_CELL : bit (3) >
    < RXQUAL_SUB_SERVING_CELL : bit (3) >
    {
        < NO_NCELL_M : {bit (3) := 111 } >
        0**              -- Padding with zeroes
    } |
    {
        < NO_NCELL_M : { bit (3) := exclude 111 } >
        { < NCELL Report : < NCELL Report struct >> } * val
(NO_NCELL_M)
        { null | 0**          -- Padding with zeroes
            | 1 < UTRAN _CSG _Measurement_Report : <
UTRAN_CSG_Measurement_Report IE > >
                { null | 0** }   -- Padding with zeroes
        }
    }
  } & octet (17) ;
< NCELL Report struct > ::=
  < RXLEV-NCELL: bit (6) >
  < BCCH-FREQ-NCELL : bit (5) >
    < BSIC-NCELL : bit (6) > ;
```

Compared to the measurement report message according to 3GPP, an additional octet is added to the element 'Measurement Results Contents' and three bits are used in the same to report to the base station—602 which type of interference or fading is present (see the tenth row of table 3).

The spare bit (present in the measurement report message according to 3GPP) is in this example used to indicate whether the interference/fading type is indicated in the measurement report or not (see the eighth row of table 3).

It should further be noted that compared to the measurement report message according to 3GPP the 27$^{th}$ row of table 3 indicates the number of octets as "& octet (17)" instead of the earlier 16 octets, indicated as "& octet (16)" (in CSN.1 notation).

The interference or fading type (see ninth row of table 3) is for example specified according to the following assignments of the two bits:

| INTERFERENCE_FADING_TYPE (3bits) |
| --- |
| 0 0 0 Adjacent Channel Interference |
| 0 0 1 Co-channel Interference |
| 0 1 0 Frequency Selective Fading |
| 0 1 1 Flat Fading |
| 1 0 0 Both Adjacent Channel interference & Frequency Selective Fading |
| 1 0 1 Both Co-channel interference & Frequency Selective Fading |
| 1 1 0 Both Adjacent Channel interference & Flat Fading |
| 1 1 1 Both Co-channel interference & & Flat Fading |

The spare bit is in this example renamed to IS_INTERFERENCE_FADING_TYPE_PRESENT (see eighth row of table 3) and indicates whether the indication of the interference or fading type is present in the measurement message 608 according to the following assignments: IS_INTEFERENCE_FADING_TYPE_PRESENT (1 bit)

0 spare bit (in accordance with 3GPP)

1 indicates that the next 3 bits contains INTERFERENCE_FADING_TYPE

In this example, if both CCI and ACI are detected by the mobile terminal 601 in downlink, then the mobile terminal 601 only indicates the type of the dominant interferer to the base station 602.

If both fading & interference are detected by the mobile terminal 601 in downlink, then the mobile terminal 601 indicates the presence of both to the base station 602. In such a case, the base station 602 can determine the mitigation technique to be selected based on the availability of the physical channel resources.

The base station 602 selects an interference mitigation technique and fading mitigation technique based on the interferer type and the fading type sent by the mobile terminal 601.

Specifically, in 609, if the presence of interference (ACI, CCI or combination of both (where only the dominant interferer is considered for interference mitigation, i.e. the base station 602 treats the situation as if only the dominant interferer was present) is confirmed by the mobile terminal 103 via the measurement report message 608, the base station 102 either does a frequency change (via a handover command, or a new channel assignment or a reconfiguration message) or initiates frequency hopping based on the available resources (frequencies) at the base station 102 (in other words in the radio cell 101 operated by the base station 102). This means that if sufficient frequency resources for frequency hopping are not present at the base station 602 (i.e. in the radio cell 101), the base station 602 initiates a frequency change of the assigned channel for the mobile terminal 601. If the base station 602 has sufficient resources to perform a frequency hopping, the base station 602 selects frequency hopping as the interference mitigation technique.

In 610, in case of frequency hopping or frequency change (via a handover command, or a new channel assignment or a reconfiguration message), the − frequencies are selected based on the interference type reported by the mobile terminal 601 and the channel frequencies already assigned by the base station 102 (e.g. already assigned for the communication with other mobile terminals located in the radio cell 101).

According to one aspect of this disclosure, in case of ACI reported by mobile terminal 601, the frequencies for downlink frequency hopping or frequency change are selected such that they are not adjacent to the channel frequencies already assigned by the base station 602 to this mobile terminal 601, since these would be the probable strongest interferers. However, in case of CCI, the base station 602 can select the downlink—frequencies which are adjacent to the channel frequencies already assigned by the base station 602 to the mobile terminal 601.

In 611, if presence of fading is reported by mobile terminal 601 by means of the measurement report message 608, for frequency selective fading the base station 602 does a frequency change (via a handover command, or a new channel assignment or a reconfiguration message) in case that resources for frequency hopping are not available (or not sufficient) or initiates frequency hopping for fading mitigation in case that recourses for frequency hopping are available. The hopping frequencies (in case of fading mitigation via frequency hopping) or the new channel frequency (in case of fading mitigation via frequency change) are selected based on the channel frequencies already assigned by the base station 602.

For flat fading, the base station 602 does not to initiate any frequency hopping or frequency change since in case of flat fading frequency hopping does typically not help in mitigating the fading. In such a case, error correction coding or interleaving may be used. Hence the base station 602 for example changes the coding scheme (e.g. including error correction and interleaving) in case of flat fading.

In 612, In case of both fading and interference, the mitigation method is selected based on availability of resources, e.g. physical channel resources (such as available frequencies etc.)

In 613, the base station 602 performs the selected interference mitigation technique and/or fading mitigation technique for the downlink transmission to the mobile terminal 601.

In summary, according to an aspect of this disclosure, one or more of the following is provided:

(i) The base station 602 is made aware of the presence of Adjacent Channel Interference (ACI) in downlink, so that it can use the same for mitigating ACI.

(ii) The base station 602 is made aware of the presence of Co-Channel Interference (CCI) in downlink direction, so that it can use the same for CCI mitigation.

(iii) The base station 602 is enabled to separately distinguish the presence of adjacent channel interference (ACI) or co-channel interference (CCI) or flat fading or frequency selective fading in downlink direction, which can help the base station 602 to do better interference/fading mitigation.

(iv) The base station 602 avoids initiating downlink frequency hopping in case of flat fading.

(v) The base station 602 is enabled to select hopping frequencies which are least probable to be affected by CCI or ACI again, according to capabilities of the mobile terminal 601.

(vi) Feedback from the mobile terminal 601 is used to perform more effective downlink interference and fading mitigation compared to a wireless communication system without such feedback.

(vii) The base station 602 may also allocate the channel to a SAIC (DTS1/DTS2) capable mobile depending on the type and extent of interference.

(viii) The resources available at the base station 602 are taken into consideration prior to selecting the fading/interference mitigation technique.

(ix) The base station 602 is aided to perform the interference/fading mitigation technique with fewer frequency resources.

(x) The base station 602 is allowed to select different mitigation techniques than frequency hopping, which are more targeted/specific to the type of interferer/fading.

It should be noted that an analogous scheme as described with reference to FIG. 6 may also be implemented for the uplink direction. In this case the roles of the mobile terminal 601 and the base station 602 are exchanged such that the processing carried out by the mobile terminal 601 as described with reference to FIG. 6 would be carried out by the base station 602 and vice versa. In this case, for example, frequency hopping would be initiated by the mobile terminal 601 for interference or fading mitigation.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
a receiver configured to receive a radio signal from another communication device via a communication channel;
a detector configured to detect the presence of an impairment of the communication channel;
a determiner configured to determine a type of the impairment of the communication channel by determining and identifying at least one of one or more types of interference and one or more types of fading affecting the communication channel; and
a transmitter configured to transmit an indication identifying the type of the impairment of the communication channel, wherein the indication identifies the at least one of the one or more types of interference and the one or more types of fading affecting the communication channel to the other communication device.

2. The communication device of claim 1, wherein the type of the impairment of the communication channel comprises one of flat fading or frequency selective fading.

3. The communication device of claim 1, wherein the type of the impairment of the communication channel is an interference type of a dominant interferer.

4. The communication device of claim 1, wherein the type of the impairment of the communication channel comprises a fading type and an interference type.

5. The communication device of claim 1, wherein the type of the impairment of the communication channel comprises at least one of adjacent channel interference or co-channel interference.

6. The communication device of claim 1, wherein the communication device is a mobile communication terminal and the other communication device is a base station or wherein the communication device is a base station and the other communication device is a mobile communication terminal.

7. The communication device of claim 1, wherein the indication is transmitted with a measurement report message.

8. A method for operating a communication device comprising:
the communication device receiving a radio signal from another communication device via a communication channel;
the communication device detecting the presence of an impairment of the communication channel;
the communication device determining a type of the impairment of the communication channel by determining and identifying at least one of one or more types of interference and one or more types of fading affecting the communication channel; and
the communication device transmitting an indication identifying the type of the impairment of the communication channel to the other communication device, wherein the indication identifies the at least one of the one or more types of interference and the one or more types of fading affecting the communication channel.

9. A communication device comprising: a transmitter configured to transmit a radio signal to another communication device via a communication channel;
a receiver configured to receive an indication of a type of an impairment of the communication channel from the other communication device, wherein the indication identifies at least one of one or more types of interference and one or more types of fading affecting the communication channel; and
a controller configured to determine, based on the indication, a mitigation mechanism for mitigating the impairment and to control the transmitter according to the determined mitigation mechanism.

10. The communication device of claim 9, wherein the mitigation mechanism is frequency hopping.

11. The communication device of claim 9, wherein the mitigation mechanism is a change in the frequency or frequencies assigned to the communication device.

12. The communication device of claim 9, wherein the communication device and the other communication device are communication devices of a cellular mobile communication system and the mitigation mechanism is handover.

13. The communication device of claim 9, wherein the mitigation mechanism is a new channel assignment or a physical channel reconfiguration.

14. The communication device of claim 9, wherein the mitigation mechanism is a change of the coding scheme used by the transmitter to transmit radio signals to the other communication device.

15. The communication device of claim 9, wherein the controller determines a mitigation mechanism other than frequency hopping or frequency change if the indication indicates that the type of impairment is flat fading.

16. The communication device of claim 9, wherein the controller is configured to determine the mitigation mechanism further based on communication resources available for a communication between the communication device and the other communication device.

17. A method for operating a communication device comprising:
the communication device transmitting a radio signal to another communication device via a communication channel;
the communication device receiving an indication of a type of an impairment of the communication channel from the other communication device, wherein the indication identifies at least one of one or more types of interference and one or more types of fading affecting the communication channel;

the communication device determining, based on the indication, a mitigation mechanism for mitigating the impairment and controlling the transmitter according to the determined mitigation mechanism.

\* \* \* \* \*